July 22, 1958  R. DENIS  2,844,177
ARRANGEMENT FOR COMMINUTING AND MINCING FOODSTUFF
Filed June 3, 1955
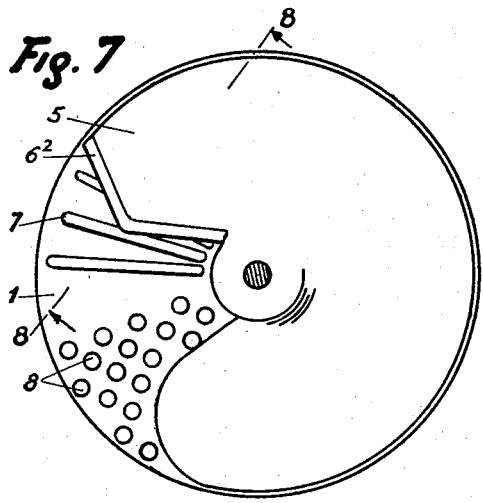
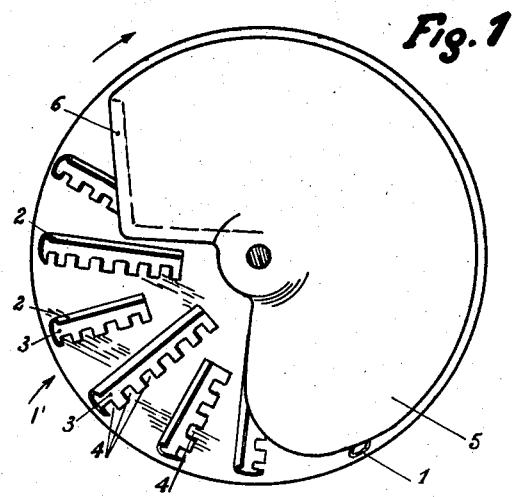
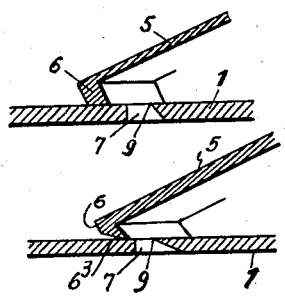
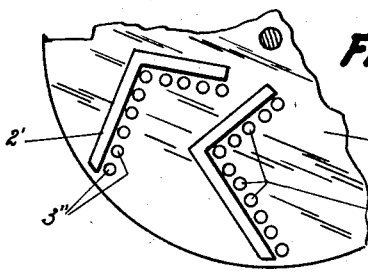
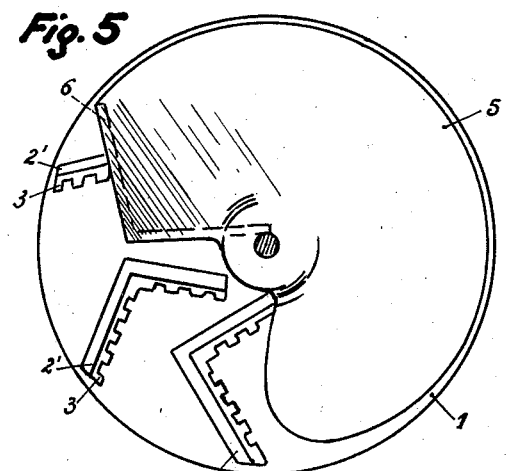
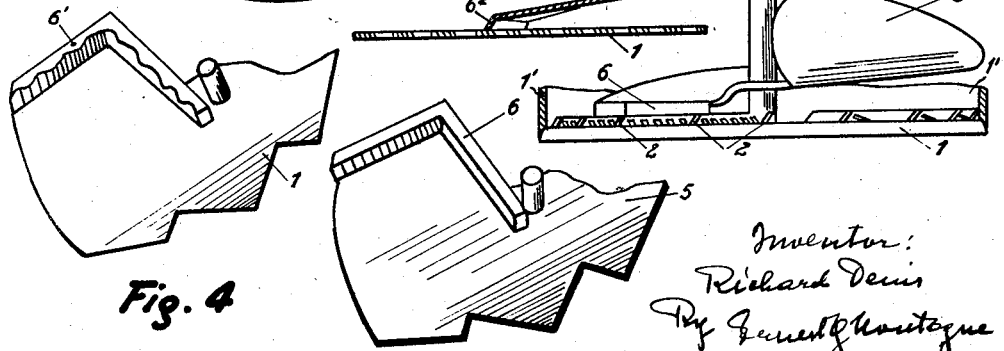
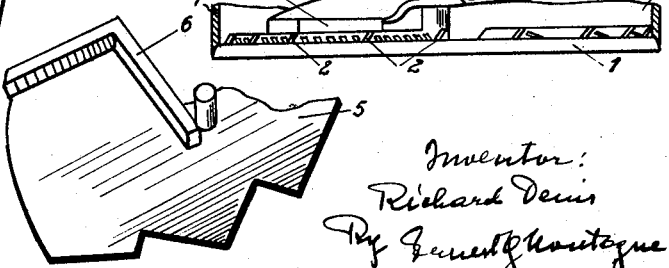

United States Patent Office 2,844,177
Patented July 22, 1958

2,844,177

ARRANGEMENT FOR COMMINUTING AND MINCING FOODSTUFF

Richard Denis, Carnieres, Belgium, assignor to Etablissements Simon & Denis, Société Anonyme, Carnieres, Belgium Application June 3, 1955, Serial No. 513,057

Claims priority, application Belgium November 9, 1954

7 Claims. (Cl. 146—167)

The present invention relates to an arrangement for comminuting and mincing foodstuff.

It is one object of the present invention to provide a kitchen apparatus adapted to subdivide and cut foodstuff chiefly with a view to execute various operations which are required when preparing a dish.

Generally speaking, such apparatuses have already been proposed for subdividing and cutting vegetables intended for the preparation of soup for instance; such prior apparatuses do not allow chopping finely in an easy manner fibrous vegetables; furthermore as far as raw meat is concerned the latter rolls over the bottom of the apparatus without passing through the perforations in said bottom otherwise than in a difficult and imperfect manner, which often constrains the housewife to dismantle the apparatus.

It is another object of the present invention to provide a kitchen apparatus which removes the drawbacks of the known structures and which has the advantage of providing a machine operating as a meat mincing and a vegetable mashing apparatus.

It is still another object of the present invention to provide a kitchen apparatus in which the foodstuff to be cut into particles is caught and gradually compressed by a conveyor worm between the latter and the bottom of the apparatus while the foodstuff is submitted to lateral pressure and is cut and minced between cutting parts rigid with the bottom of the container and at least one cutter secured to the lower end of the conveyor worm.

With these and other objects in view which will become apparent in the following detailed description, the present invention will be clearly understood in connection with the accompanying drawings, in which:

Figure 1 is a plan view of the bottom plate of the apparatus container and of the conveyor worm;

Fig. 2 is an elevational view of said bottom plate and worm, partly in section;

Fig. 3 is a view from underneath of a part of the conveyor worm;

Fig. 4 shows a modified embodiment of the cutter rigid with the worm;

Fig. 5 is a plan view of a modification of the bottom plate;

Fig. 6 is a fragmentary plan view of a further embodiment of the bottom plate;

Fig. 7 is a plan view of the bottom and of the conveyor worm;

Fig. 8 is a cross section along the lines 8—8 of Fig. 7;

Fig. 9 is a cross section of a modification of the cutter shown in Fig. 7; and

Fig. 10 is a cross section of a still further modification of said cutter.

In the embodiment illustrated in Figs. 1 to 3, the bottom 1 of a container 1', the shape of which is irrelevant, carries radially arranged stationary cutters 2.

In front of each cutter 2, there is provided, facing the direction of rotation of the conveyor worm 5 an opening 3 which permits of removal of the cut and subdivided particles of vegetables or of meat.

Preferably there are found in front of the openings 3 perforations or cut sections forming tongues 4 which are slightly raised so as to improve the cutting of the subdivided foodstuff; this arrangement has in fact been proposed already for various kitchen apparatuses of the same type.

The bottom plate 1 cooperates with the rotary conveyor or worm 5 adapted to catch the foodstuff to be subdivided and cut and to urge it subsequently towards the said bottom plate 1 and to compress it gradually during its progression between the worm 5 and the bottom plate 1.

The lower end of the conveyor worm 5 forms a cutter 6 which has an angular shape so as to gradually engage the stationary cutters 2 and to cut into small particles the foodstuff urged against the bottom, thus the inner portion of the cutter 6 facing the cutters 2 of the bottom plate 2.

This angular shape given to the movable cutter 6 provides a further compression of the material to be cut; as a matter of fact after its compression under the action of a vertical thrust exerted by the worm 5 and directed towards the bottom, the material is compressed laterally.

Thus the particles to be cut are compressed between the worm 5 and the bottom plate 1 and also between the angularly offset arms of the cutter 6.

A further advantage of the cutter 6 positioned underneath the lower edge of the worm resides in the fact that it holds fast the material to be cut, which is thus prevented from moving sideways and is thus submitted of necessity to the action of the cooperating cutters 2 and 6.

In the drawing, the cutter 6 is shown as forming an obtuse angle and having two arms defining a center at the point of the meeting of said two arms and opening forwardly with reference to the direction of progression of the worm, but obviously the compression of the already compressed material by the cutter 6 acting between the bottom plate 1 and the worm 5 may be obtained as well by giving said cutter 6 the shape of a right angle or of an acute angle.

Fig. 4 illustrates a cutter 6' the cutting surface of which is corrugated so as to further the cutting of the material.

It is also possible to increase the lateral pressure exerted on the material urged by the conveyor worm 5 against the bottom plate 1 by giving the stationary cutters 2' on the bottom plate 1 of the machine an angular shape the opening of which faces the cutter 6 on the worm as shown in Fig. 5.

In front of the cutters 2' are formed preforations 3 the shape of which is irrelevant; it is possible in fact to provide in front of the cutters 2' a multiplicity of exit ports 3" as shown in Fig. 6.

It has been found that it is not necessary to provide on the bottom plate 1 cutters projecting above the operative surface of said bottom plate 1 and that the subdivision and mincing of the foodstuff may be executed reliably by the compression exerted first vertically and then in a horizontal plane over a bottom plate 1 provided merely with perforations, the material being thus perfectly comminuted.

It is therefore possible to operate with a bottom plate 1 having a smooth surface, in which case the stationary cutters are formed merely by the openings formed in said bottom plate 1.

If the bottom plate 1 is not very thick, the edges of the openings therein form the actual cutting means but obviously in the case of a bottom plate of substantial thickness, it is possible to provide a sharp cutting edge on the portions of the perforations or openings facing the direction of progression of the conveyor worm, said cutting edge cooperating with the cutter on the edge of the worm so as to provide for the desired cutting of the material through subdivision and mincing.

In the modified embodiment illustrated in Figs. 7 and 8 the angularly shaped cutter $6^2$ is formed through a folding of the lower end of the worm conveyor. It is thus possible to obtain the cutter $6^2$ during the stamping of the worm conveyor 5.

The bottom plate 1 is provided with openings which may receive the shape of slots 7 or of circular perforations 8.

As illustrated in Figs. 9 and 10, the slots 7 and the perforations 8 are provided with a cutting edge 9 on the side of the opening facing the direction of progression of the conveyor worm 5.

The cutting edge of the worm conveyor 5 may be formed on a terminal section perpendicular to the bottom plate 1 or forming with the latter an obtuse angle as illustrated in Figs. 7 and 8 or else an acute angle as illustrated in Figs. 9 and 10.

To increase the cutting action of the cutter 6, the terminal portion 63 thereof which is in contact with the bottom plate 1 may be bevelled, as illustrated in Fig. 10.

The angularly shaped cutter 6 of the conveyor worm 5 has also for its action a shifting of the material which might otherwise have a tendency to slide outwardly of the cutter; i. e. towards the center and towards the periphery of the bottom plate 1, the angularly shaped cutter 6 urging it towards the tip of the angle formed by the cutter 6, i. e. towards the point where its operation is most efficient whereby at the end of the operation there is no waste material left in the apparatus.

While I have disclosed several embodiments of the present invention, it is to be understood that these embodiments are given by example only and not in a limiting sense, the scope of the present invention being determined by the objects and the claims.

I claim:

1. An apparatus for subdividing and mincing foodstuff and the like comprising a container including a perforated bottom plate, a worm conveyor adapted to revolve upon an axis perpendicular to said bottom plate, the bottom portion of said worm conveyor extending in close proximity with said bottom plate to urge the material lying on said bottom plate into contacting engagement with the latter thus applying axial pressure to said material, a cutter carried by and integrally with the lower edge of said conveyor worm, and having two arms forming an angle relative to each other facing the direction of movement of said conveyor worm and defining a center at the point of the meeting of said two arms, said cutter opening forwardly with reference to the direction of progression of said worm conveyor and consequently adapted to urge the material towards said center of the angle formed by said arms of said cutter to apply lateral pressure to said material, and cooperating with said bottom plate to comminute said material compressed between said center of said conveyor worm and said bottom plate.

2. The apparatus, as set forth in claim 1, wherein said cutter of said worm conveyor has an edge directed downwardly towards said bottom plate.

3. The apparatus, as set forth in claim 1, wherein said cutter of said worm conveyor has an edge bevelled towards said bottom plate.

4. The apparatus, as set forth in claim 1, in which said cutter has a serrated cutting edge.

5. The apparatus, as set forth in claim 1, in which said cutter extends perpendicularly to said bottom plate.

6. The apparatus, as set forth in claim 1, in which said cutter forms an acute angle with said bottom plate.

7. The apparatus, as set forth in claim 1, in which said cutter forms an obtuse angle with said bottom plate.

References Cited in the file of this patent

UNITED STATES PATENTS

| | | |
|---|---|---|
| 1,802,203 | Dosch | Apr. 21, 1931 |
| 1,902,653 | Lindgren | Mar. 21, 1933 |
| 2,196,455 | Klod | Apr. 9, 1940 |
| 2,611,408 | Farmer | Sept. 23, 1952 |
| 2,688,994 | Simon et al. | Sept. 14, 1954 |